(12) United States Patent
Amante et al.

(10) Patent No.: US 11,719,018 B2
(45) Date of Patent: Aug. 8, 2023

(54) REMOVABLE MAGNETIC DOOR HANDLE

(71) Applicant: Bell Textron Inc., Fort Worth, TX (US)

(72) Inventors: William Anthony Amante, Grapevine, TX (US); Arunkumar Koppa Siddalingappa, Bangalore (IN); Darpan Bansal, New Delhi (IN)

(73) Assignee: TEXTRON INNOVATIONS INC., Providence, RI (US)

( * ) Notice: Subject to any disclaimer, the term of this patent is extended or adjusted under 35 U.S.C. 154(b) by 477 days.

(21) Appl. No.: 16/915,377

(22) Filed: Jun. 29, 2020

(65) Prior Publication Data

US 2021/0363780 A1 Nov. 25, 2021

(30) Foreign Application Priority Data

May 21, 2020 (IN) .......................... IN202021021432

(51) Int. Cl.
 *E05B 1/00* (2006.01)
 *B64C 1/14* (2006.01)
 *B64C 29/00* (2006.01)
(52) U.S. Cl.
 CPC .......... *E05B 1/0015* (2013.01); *B64C 1/1461* (2013.01); *B64C 29/0033* (2013.01)
(58) Field of Classification Search
 CPC ..... B64C 1/1461; E05B 1/0015; A45C 13/22; A45C 2013/223

USPC ................... 16/413, 422, 425, 426
See application file for complete search history.

(56) References Cited

U.S. PATENT DOCUMENTS

| | | | | |
|---|---|---|---|---|
| 3,484,894 A | * | 12/1969 | Fletcher | A47B 95/02 16/422 |
| 5,887,927 A | * | 3/1999 | Kurek, III | B65D 25/2835 16/415 |
| 8,567,430 B2 | * | 10/2013 | Allen | E03C 1/0412 137/315.15 |
| 2017/0283030 A1 | * | 10/2017 | Terry | B64F 1/30 |
| 2020/0190847 A1 | * | 6/2020 | Roberts | E05B 1/0015 |

* cited by examiner

*Primary Examiner* — Tien Q Dinh
*Assistant Examiner* — William L Gmoser
(74) *Attorney, Agent, or Firm* — Akona IP (57) ABSTRACT

A handle assembly for an access panel is described and includes a support structure including upper and lower supports attached to the access panel, each of the upper and lower supports comprising a top face and a bottom face; a handle for selectively engaging with the support structure, the handle comprising a grip portion and upper and lower flanges extending perpendicularly from the grip portion, each of the upper and lower flanges comprising a top face; and a retention mechanism for retaining the handle in contact with the support structure with a combination of magnetic and mechanical force.

16 Claims, 7 Drawing Sheets

REMOVABLE MAGNETIC DOOR HANDLE

FOREIGN APPLICATION CLAIM OF PRIORITY

This application claims the benefit of priority under 35 U.S.C. 119(b) to Indian National Phase Patent Application Serial No. 202021021432 entitled, "REMOVABLE MAGNETIC DOOR HANDLE," filed on 21 May 2020. The disclosure of this prior application is considered part of (and is incorporated by reference in) the disclosure of this application.

TECHNICAL FIELD

This disclosure relates in general to the field of aircraft and, more particularly, though not exclusively, to a removable magnetic door handle for such aircraft.

BACKGROUND

Aircraft typically have provided on exterior surfaces thereof doors or access panels for enabling access to an aircraft interior. Such doors or panels are often exceptionally large and therefore benefit from having handles disposed thereon to facilitate removal of the door/panel from and installation of the door/panel on the aircraft; however, handles on an exterior surface of an aircraft result in excess weight and added aerodynamic drag.

SUMMARY

One embodiment is a handle assembly for an access panel comprising a support structure including upper and lower supports attached to the access panel, each of the upper and lower supports comprising a top face and a bottom face; a handle for selectively engaging with the support structure, the handle comprising a grip portion and upper and lower flanges extending perpendicularly from the grip portion, each of the upper and lower flanges comprising a top face; and a retention mechanism for retaining the handle in contact with the support structure with a combination of magnetic and mechanical force.

Another embodiment is an access panel comprising at least one handle assembly connected to the access panel, the at least one handle assembly comprising a support structure including upper and lower supports attached to the access panel, each of the upper and lower supports comprising a top face and a bottom face; a handle for selectively engaging with the support structure, the handle comprising a grip portion and upper and lower flanges extending perpendicularly from the grip portion, each of the upper and lower flanges comprising a top face; and a retention mechanism comprising a pair of magnets and a keyed slot for retaining the handle in contact with the support structure.

Another embodiment is an aircraft comprising an access panel; at least one handle assembly connected to the access panel, the at least one handle assembly comprising: a support structure including upper and lower supports attached to the access panel, each of the upper and lower supports comprising a top face and a bottom face; a handle for selectively engaging with the support structure, the handle comprising a grip portion and upper and lower flanges extending perpendicularly from the grip portion, each of the upper and lower flanges comprising a top face; and a retention mechanism comprising a pair of magnets and a keyed slot for retaining the handle in contact with the support structure.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a removeable magnetic door handle for selectively connecting to a door or access panel (hereinafter collectively referred to as a "door") of an aircraft, for example. In accordance with features of embodiments described herein, the removable magnetic door handle includes self-locating rare earth magnets that assist in pulling handle into its installed position and locking the handle into place. In particular, and as will be described in greater detail below. The magnets pull the handle into a location that includes a keyed slot to further lock the handle into place to withstand door removal handling loads or wind gust loads and prevent handle rotation. No fasteners or alignment efforts are needed, resulting in reduced installation/removal time, as well as reduced labor costs. The design is scalable, modular, and may be used for any door or access panel hold requirements, as well as operations and maintenance. Handle weight and aerodynamic drag may be eliminated from the aircraft by removing the handle during flight and attaching it when the door or access panel needs to be removed.

Figure 1:
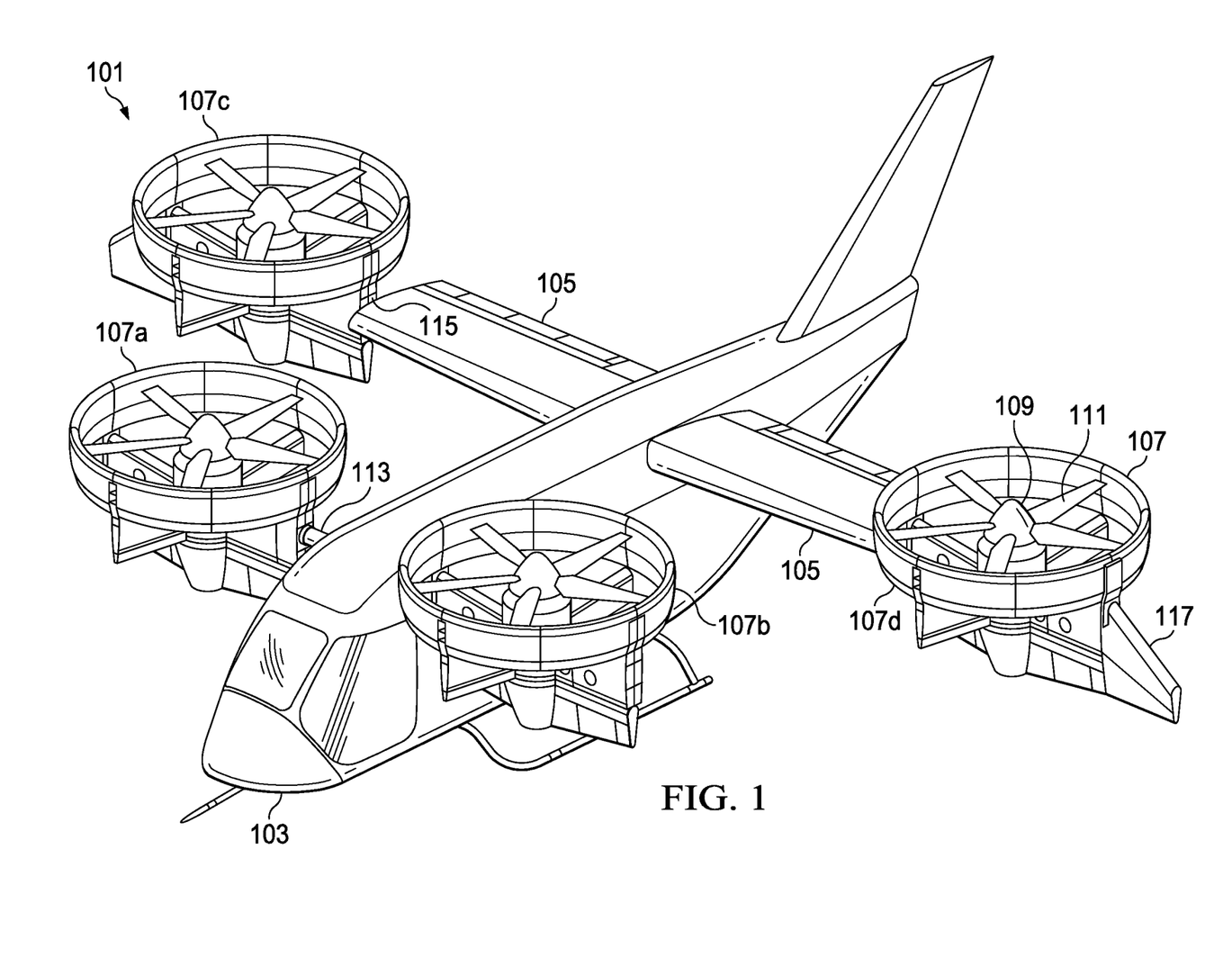
FIGS. 1 and 2 illustrate an example tiltrotor aircraft in which a removable magnetic door handle in accordance with embodiments described herein may be implemented and showing the aircraft configured to operate in a helicopter mode and an airplane mode, respectively.
Figure 2:
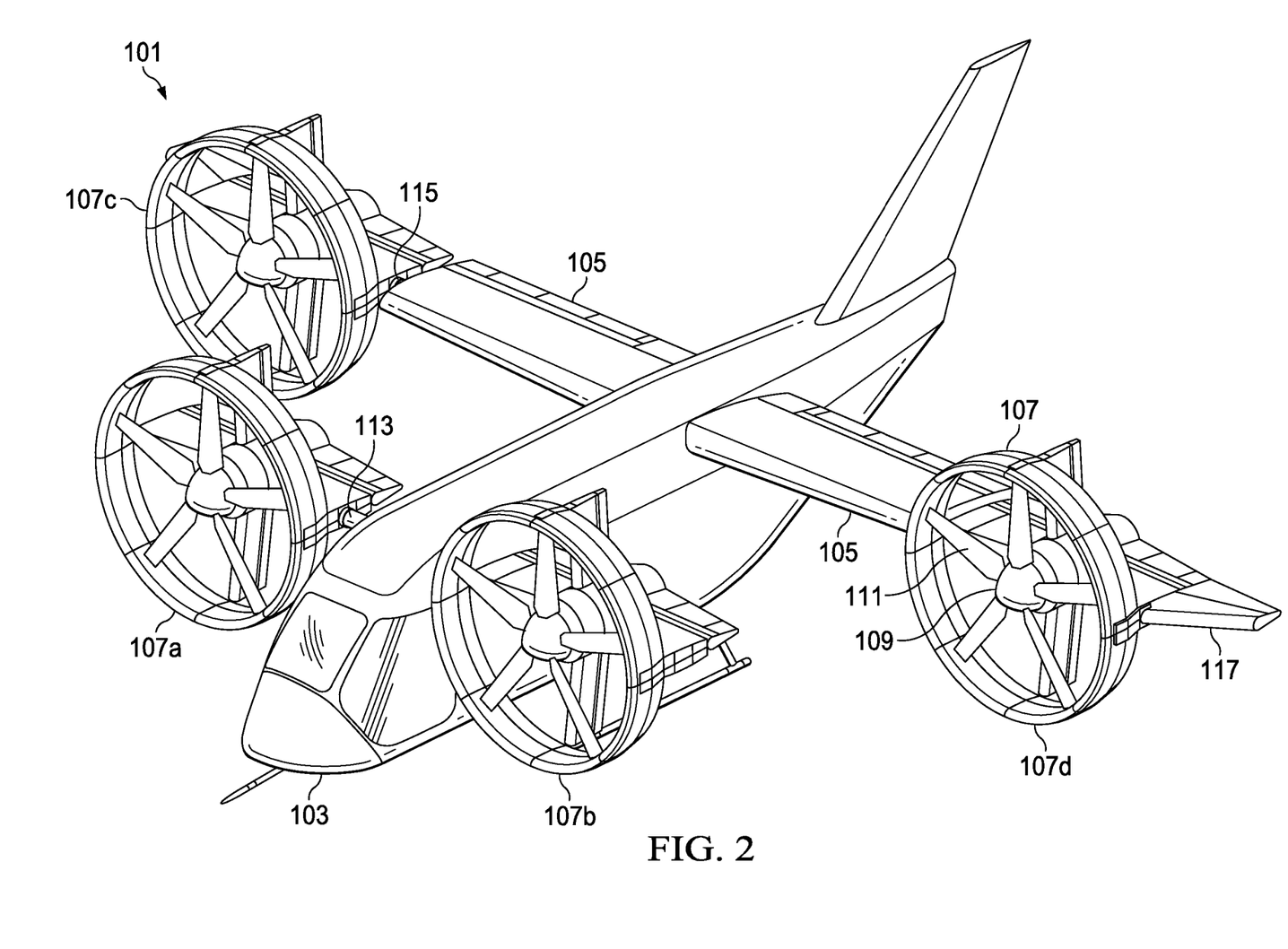

FIGS. 1 and 2 illustrate an example tiltrotor aircraft 101 that includes ducted rotors (or fans). The tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing.

Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

In the illustrated embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducted fans 107 may be tiltable between the vertical and horizontal positions by spindles 113, 115, which are rotatable in response to commands originating from a pilot and/or a flight control system of the aircraft 101.

Figure 3:
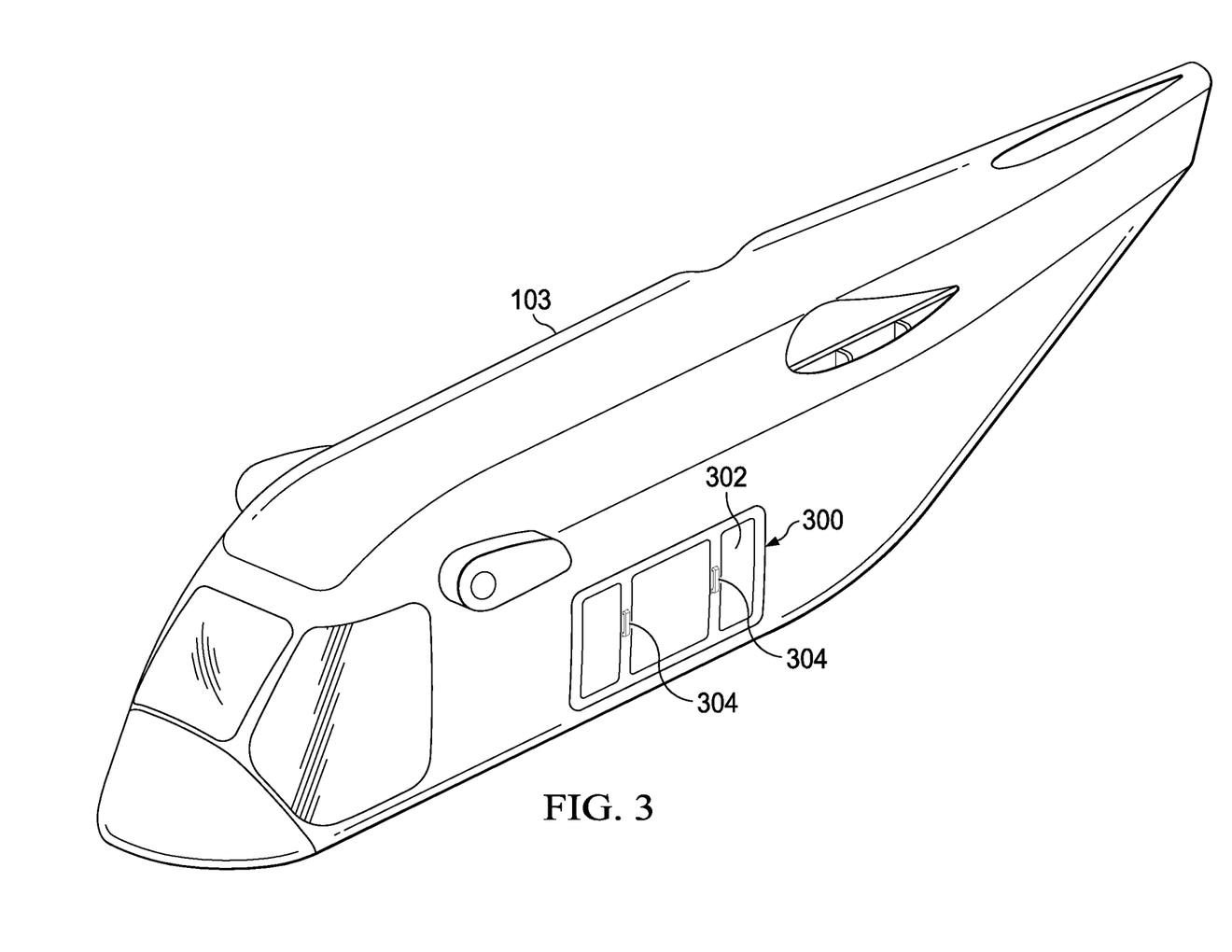
FIG. 3 is an illustration of the tiltrotor aircraft of FIGS. 1 and 2 with the wing and rotors removed to facilitate illustration and explanation of the removable magnetic door handle in accordance with embodiments described herein.

FIG. 3 illustrates the fuselage 103 of the aircraft 101 so that a door, or access panel, 300 is more clearly visible. In certain embodiments, door 300 covers an opening in skin 302 of the fuselage 103; therefore, removing the door 300 provides access to the opening and thus into the fuselage. It will be recognized that, although not shown in FIG. 3, aircraft 101 may be provided with additional doors for accessing areas of the aircraft internal to the fuselage 103, for example. As shown in FIG. 3, door 300 is provided with removable magnetic door handles 304 embodying features that will be described in greater detail hereinbelow.

Figure 4:
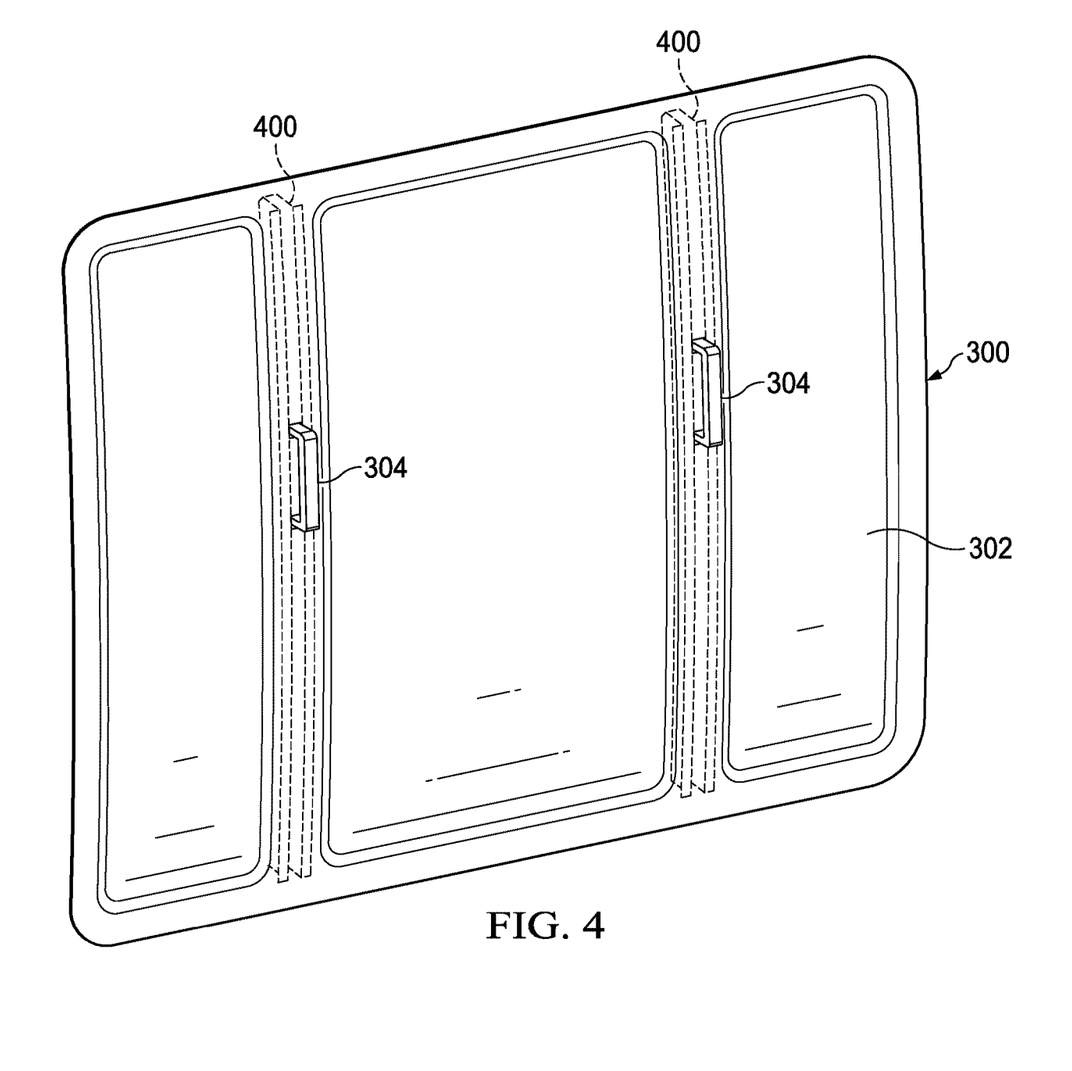
FIG. 4 illustrates a door panel for a tiltrotor aircraft to which a pair of removable magnetic door handles in accordance with embodiments described herein are connected.

FIG. 4 is a more detailed view of the door 300 with the handles 304 attached. In one embodiment, as shown in FIG. 4, door 300 includes channels 400 (in particular, C-channels) in which handles 304 are attached and/or secured, as will be described in greater detail below. Channels 400 may be made from aluminum and may be standard extrusions or machined parts. In certain embodiments, channels comprise a support structure for the door panel for providing additional stiffness.

It will be recognized that, while handles 304 are useful and/or necessary for removing the door 300 from the fuselage 103 and returning the door to the fuselage, during flight of the aircraft 101, the handles increase the weight of the aircraft and result in aerodynamic drag. Therefore, the fact that handles 304 may be selectively securely attached to the door 300 when needed and easily removed from the door 300 when not in use and/or when the aircraft 101 is in flight is highly beneficial.

Figure 5:
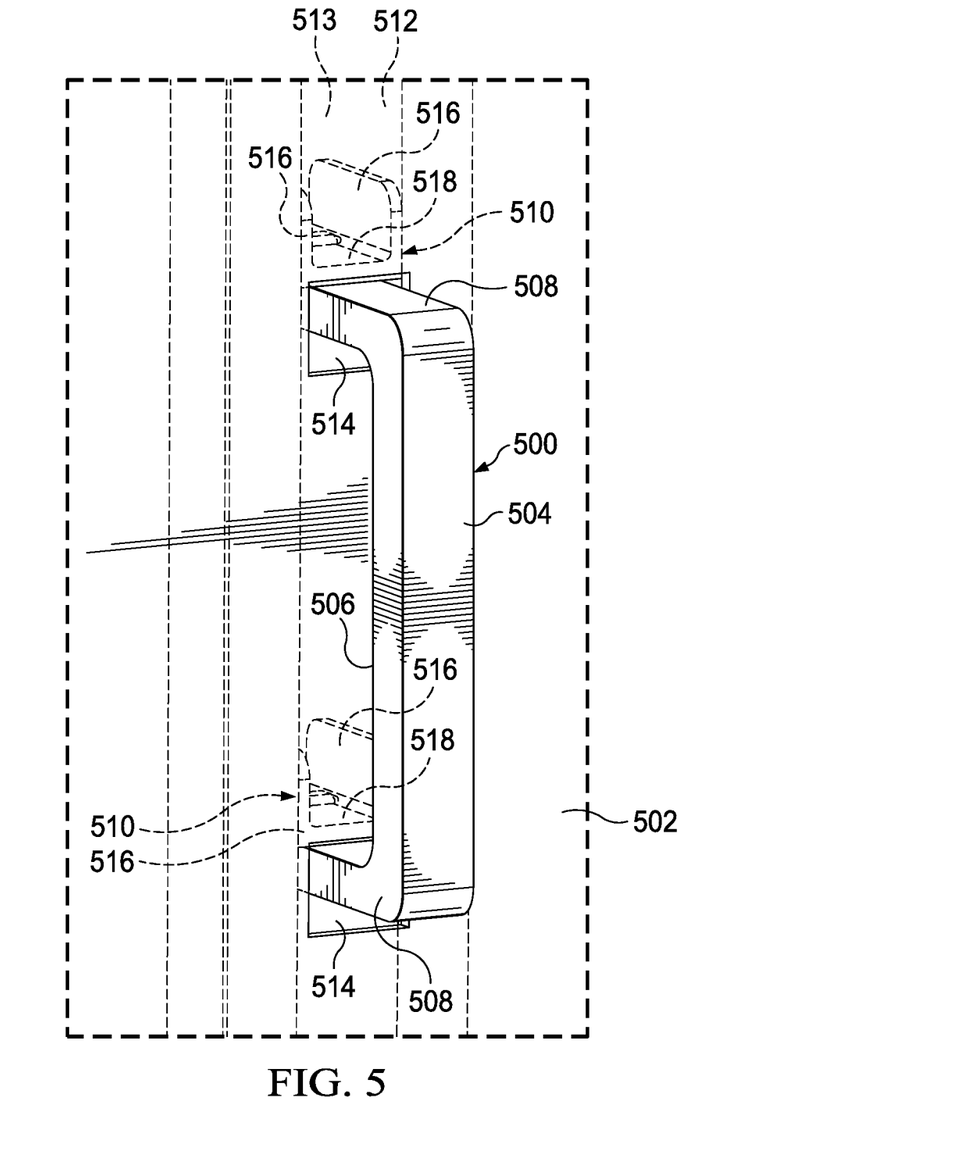
FIG. 5 illustrates a more detailed view of a removeable magnetic door handle in accordance with embodiments described herein.

FIG. 5 is a more detailed view of a removable magnetic door handle 500 (which may be used to implement handles 304) connected to a door 502 (which may correspond to door 300) in accordance with features of embodiments described herein. As shown in FIG. 5, removable magnetic door handle 500 comprises an elongated grip portion 504 that may be grasped by a user during removal and/or installation of the door 502 in connection with an aircraft. As shown in FIG. 5, in certain embodiments features 506 comprising indentations may be provided on an interior face of grip portion 504 for accommodating the user's fingers, rendering the grip portion 504 easier and more comfortable to grasp. Flanges 508 are disposed on opposite ends of grip portion 504 and extend substantially perpendicular to and form approximately 90 degree angles with the grip portion such that the handle 500 has a roughly C-shaped profile. In accordance with features of embodiments described herein, handle supports 510 are provided and are recessed within a channel 512 provided in an external face of the door 502. As illustrated in FIG. 5, the channel 512 may be covered by a skin 513 of the door 502 (or a separate skin), with openings 514 in the skin provided for receiving flanges 508. In certain embodiments, supports 510 comprise C-channels portions including a web 516 and flanges 518. Flanges 518 engage side walls of the channel 512. As illustrated in FIG. 5, dimensions (e.g., depth and width) of the channel 512 are sufficient to accommodate corresponding dimensions of the supports 510. Supports 510 may be made from aluminum and may be fastened to or integrated with channels 400.

As will be described in greater detail below, distal ends of upper faces of flanges 508 engage with bottom faces of supports 510 and are maintained in contact and appropriate alignment with one another via magnetic and mechanical forces.

Figure 6A:
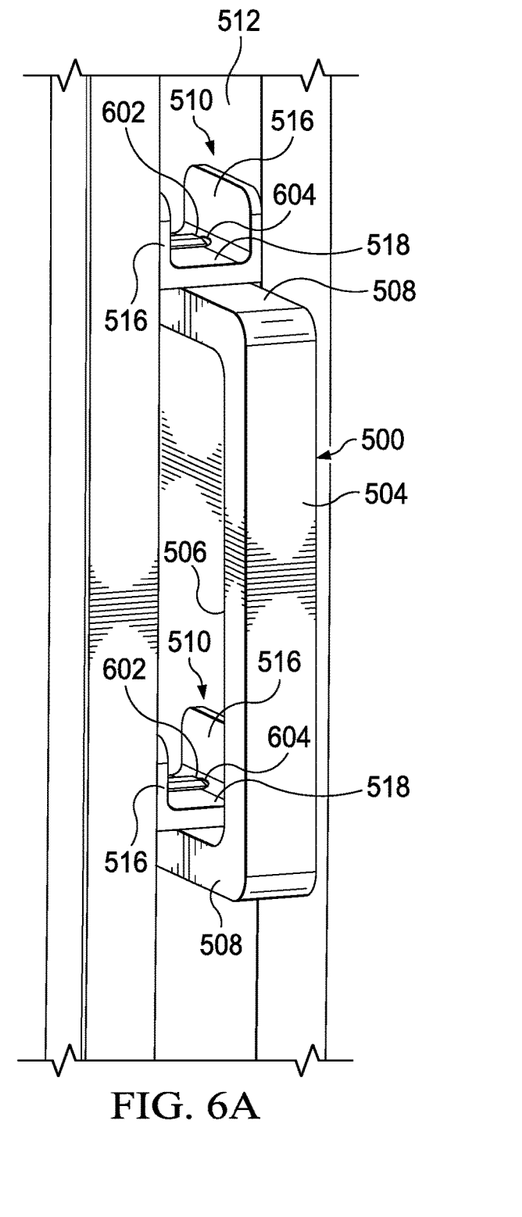
FIGS. 6A and 6B illustrate operation of the removable magnetic door handle of FIG. 5.
Figure 6B:
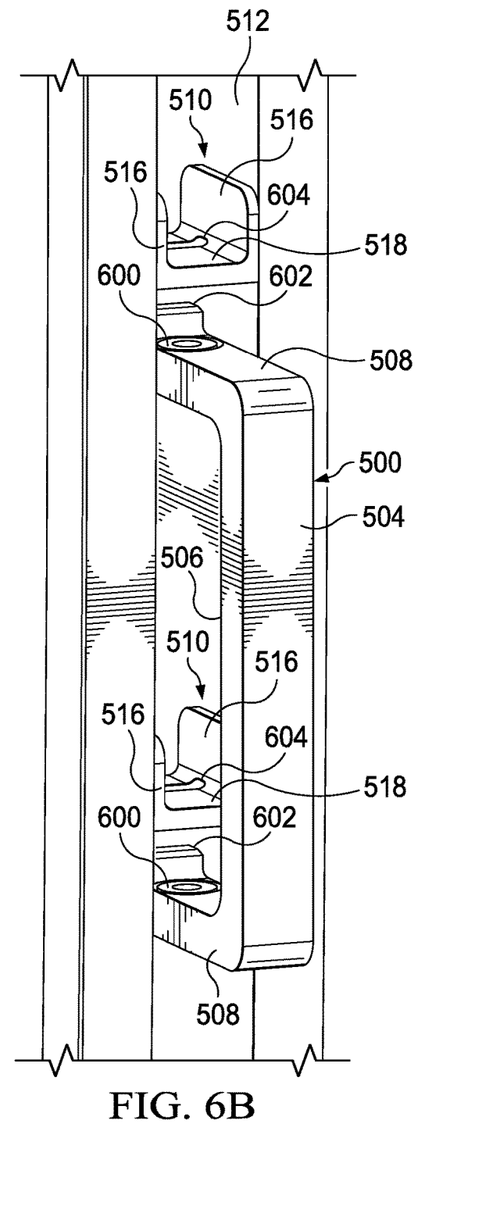
Figure 7:
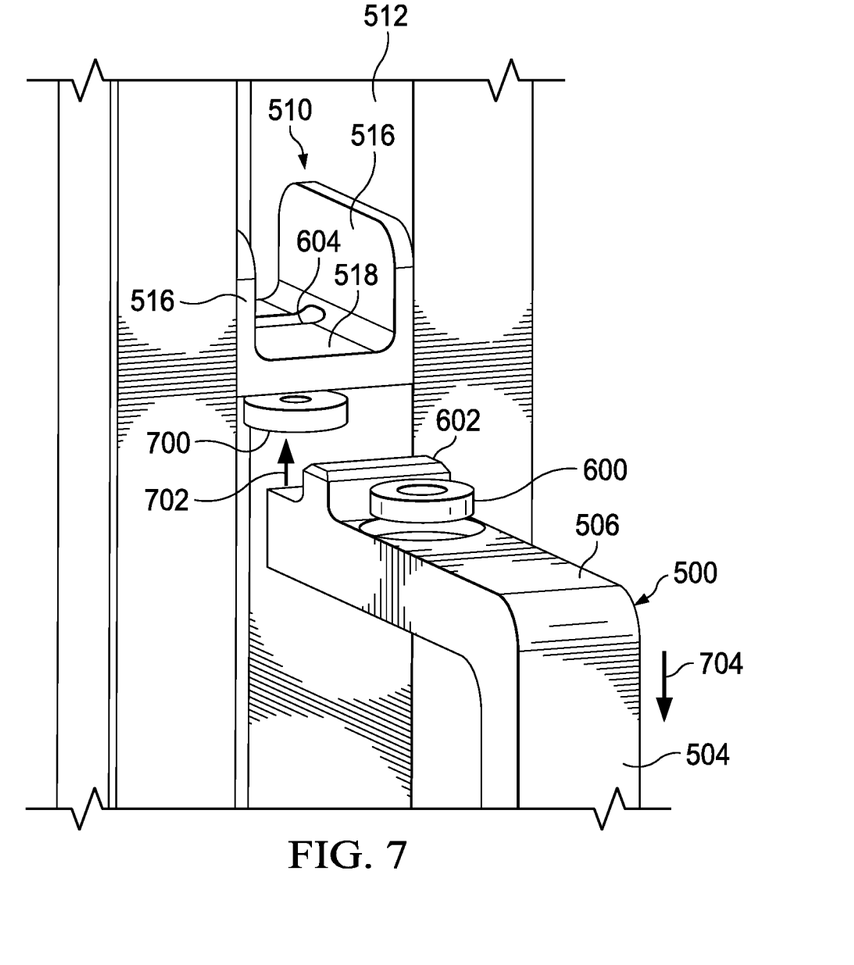
FIG. 7 illustrates a more detailed view of a connection mechanism for connecting a top end of the removable magnetic door handle of FIG. 5 to the door panel.

Installation and removal of the handle 500 will now be described with reference to FIGS. 6A, 6B and 7. As best shown in FIGS. 6B and 7, magnets 600 are disposed on or in flanges 508. In particular, the magnets 600 may be recessed into flanges 508 and exposed through upper faces thereof. In certain embodiments, magnets 600 are implemented as rare earth magnets, which are strong permanent magnets made from alloys of rare-earth elements. Rare-earth magnets are the strongest type of permanent magnets currently available, producing magnetic fields in excess of 1.4 teslas, whereas ferrite or ceramic magnets typically exhibit fields of 0.5 to 1 tesla.

Additionally, top faces of flanges 508 may be provided with locking features 602 disposed proximate distal ends thereof. In certain embodiments, locking features 602 may be implemented as tabs or protrusions projecting from top faces of flanges 508 for engaging with slots 604 disposed in bottom faces of webs 516 of supports 510. Slots 604 may be disposed only partially through webs 516 or may be cut all the way through webs 516. Together, one of the features 602 and the corresponding slot 604 comprise a "keyed slot." As best shown in FIG. 7, supports 510 are also provided with magnets 700, which may be recessed into and exposed on bottom faces of webs 516. As with the magnets 600, the magnets 700 comprise rare earth magnets.

Referring specifically to FIG. 6B, in accordance with features of embodiments described herein, corresponding pairs of magnets 600, 700, exhibit sufficient attractive force upon one another to draw the upper faces of the flanges 508 toward the bottom faces of the webs 516, as indicated by arrows 702, pulling the locking features 606 into the slots 604 to ensure proper alignment of the handle 500 within the channel 512, and to maintain the handle in secure connection with the door 502 until the handle is manually removed; that is, until manual force sufficient to overcome the magnetic attraction is exerted on the handle in a direction indicated by an arrow 704. The orientation of the handle installation with door is such that gravity, the locking feature and magnets all work together in unison to eliminate the need for fasteners.

It will be noted that engagement of locking features 602 within slots 604 prevent the handle 500 from being disengaged from the door 502 merely by applying force in a direction perpendicular to the face of the door (i.e., pulling the handle out) or rotation of the handle relative to the door. Allowing rotation of the handle relative to the door would reduce control of handling the door and cause persons hand to be pinched between door and handle. It is anticipated that other types of locking mechanisms including a protrusion and appropriately shaped receptacle for preventing such disengagement of the handle 500 from the door 502 may additionally and/or alternatively be provided for performing the same function.

It should be appreciated that aircraft illustrated herein, such as aircraft 101, is merely illustrative of a variety of aircraft that can implement the embodiments disclosed herein. Indeed, the various embodiments described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, fixed wing aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

Example 1 is a handle assembly for an access panel including a support structure including upper and lower supports attached to the access panel, each of the upper and lower supports comprising a top face and a bottom face; a handle for selectively engaging with the support structure, the handle comprising a grip portion and upper and lower flanges extending perpendicularly from the grip portion, each of the upper and lower flanges comprising a top face; and a retention mechanism for retaining the handle in contact with the support structure with a combination of magnetic and mechanical force.

In Example 2, the handle assembly of Example 1 may further include the retention mechanism comprising a pair of magnets and a keyed slot.

In Example 3, the handle assembly of any of Examples 1 and 2 may further include each of the magnets comprising a rare earth magnet.

In Example 4, the handle assembly of any of Examples 1-3 may further include a first magnet of the pair of magnets being disposed in the top face of the upper flange and wherein a second magnet of the pair of magnets being disposed in the bottom face of the upper support.

In Example 5, the handle assembly of any of Examples 1-4 may further include the keyed slot comprising a protrusion in one of the top face of the upper flange and the bottom face of the upper support and a corresponding slot for receiving and retaining the protrusion disposed in the other one of the top face of the upper flange and the bottom face of the upper support.

In Example 6, the handle assembly of any of Examples 1-5 may further include the retention mechanism comprising a first retention mechanism for retaining the top face of the upper flange in contact with the bottom face of the upper support and a second retention mechanism for retaining the top face of the lower flange in contact with the bottom face of the lower flange.

In Example 7, the handle assembly of any of Examples 1-6 may further include the retention mechanism inhibiting movement of the handle in a direction normal to a plane of the access panel.

In Example 8, the handle assembly of any of Examples 1-7 may further include the retention mechanism inhibiting movement of the handle in a downward direction absent application of a predetermined force.

Example 9 is an access panel including at least one handle assembly connected to the access panel, the at least one handle assembly comprising a support structure including upper and lower supports attached to the access panel, each of the upper and lower supports comprising a top face and a bottom face; a handle for selectively engaging with the support structure, the handle comprising a grip portion and upper and lower flanges extending perpendicularly from the grip portion, each of the upper and lower flanges comprising a top face; and a retention mechanism comprising a pair of magnets and a keyed slot for retaining the handle in contact with the support structure.

In Example 10, the access panel of Example 9 may further include each of the magnets comprising a rare earth magnet.

In Example 11, the access panel of any of Examples 9-10 may further include a first magnet of the pair of magnets being disposed in the top face of the upper flange and a second magnet of the pair of magnets being disposed in the bottom face of the upper support.

In Example 12, the access panel of any of Examples 9-11 may further include the keyed slot comprising a protrusion in one of the top face of the upper flange and the bottom face of the upper support and a corresponding slot for receiving and retaining the protrusion disposed in the other one of the top face of the upper flange and the bottom face of the upper support.

In Example 13, the access panel of any of Examples 9-12 may further include the retention mechanism comprising a first retention mechanism for retaining the top face of the upper flange in contact with the bottom face of the upper support and a second retention mechanism for retaining the top face of the lower flange in contact with the bottom face of the lower flange.

In Example 14, the access panel of any of Examples 9-13 may further include the keyed slot inhibiting movement of the handle in a direction normal to a plane of the access panel.

In Example 15, the access panel of any of Examples 9-14 may further include the pair of magnets inhibiting movement of the handle in a downward direction absent application of a predetermined force.

Example 16 is an aircraft comprising an access panel; at least one handle assembly connected to the access panel, the at least one handle assembly comprising a support structure including upper and lower supports attached to the access panel, each of the upper and lower supports comprising a top face and a bottom face; a handle for selectively engaging with the support structure, the handle comprising a grip portion and upper and lower flanges extending perpendicularly from the grip portion, each of the upper and lower flanges comprising a top face; and a retention mechanism comprising a pair of magnets and a keyed slot for retaining the handle in contact with the support structure.

In Example 17, the aircraft of Example 16 may further include each of the magnets comprising a rare earth magnet and a first magnet of the pair of magnets being disposed in the top face of the upper flange and wherein a second magnet of the pair of magnets being disposed in the bottom face of the upper support.

In Example 18, the aircraft of any of Examples 16-17 may further include the keyed slot comprising a protrusion in one of the top face of the upper flange and the bottom face of the upper support and a corresponding slot for receiving and retaining the protrusion disposed in the other one of the top face of the upper flange and the bottom face of the upper support.

In Example 19, the aircraft of any of Examples 16-18 may further include the retention mechanism comprising a first retention mechanism for retaining the top face of the upper flange in contact with the bottom face of the upper support and a second retention mechanism for retaining the top face of the lower flange in contact with the bottom face of the lower flange.

In Example 20, the aircraft of any of Examples 16-19 may further include the keyed slot inhibiting movement of the handle in a direction normal to a plane of the access panel and the pair of magnets inhibiting movement of the handle in a downward direction absent application of a predetermined force.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A handle assembly for an access panel comprising:
   a support structure including upper and lower supports attached to the access panel, each of the upper and lower supports comprising a top face and a bottom face;
   a handle for selectively engaging with the support structure, the handle comprising:
      a grip portion; and
      upper and lower flanges extending perpendicularly from the grip portion, each of the upper and lower flanges comprising a top face; and
   a retention mechanism for retaining the handle in contact with the support structure with a combination of a magnetic force and a mechanical force, wherein the retention mechanism comprises a pair of magnets and a keyed slot, wherein the pair of magnets are disposed closer to the grip portion than the keyed slot.

2. The handle assembly of claim 1, wherein each of the magnets comprises a rare earth magnet.

3. The handle assembly of claim 1, wherein a first magnet of the pair of magnets is disposed in the top face of the upper flange and wherein a second magnet of the pair of magnets is disposed in the bottom face of the upper support.

4. The handle assembly of claim 1, wherein the keyed slot comprises a protrusion in one of the top face of the upper flange and the bottom face of the upper support and a corresponding slot for receiving and retaining the protrusion disposed in the other one of the top face of the upper flange and the bottom face of the upper support.

5. The handle assembly of claim 1, wherein the retention mechanism comprises a first retention mechanism for retaining the top face of the upper flange in contact with the bottom face of the upper support and a second retention mechanism for retaining the top face of the lower flange in contact with the bottom face of the lower flange.

6. The handle assembly of claim 1, wherein the retention mechanism inhibits movement of the handle in a direction normal to a plane of the access panel.

7. An access panel comprising:
   at least one handle assembly connected to the access panel, the at least one handle assembly comprising:
      a support structure including upper and lower supports attached to the access panel, each of the upper and lower supports comprising a top face and a bottom face;
      a handle for selectively engaging with the support structure, the handle comprising:
         a grip portion; and
         upper and lower flanges extending perpendicularly from the grip portion, each of the upper and lower flanges comprising a top face; and
      a retention mechanism comprising a pair of magnets and a keyed slot for retaining the handle in contact with the support structure;
   wherein a first magnet of the pair of magnets is disposed in the top face of the upper flange and wherein a second magnet of the pair of magnets is disposed in the bottom face of the upper support;
   wherein the keyed slot comprises a protrusion in one of the top face of the upper flange and the bottom face of the upper support and a corresponding slot for receiving and retaining the protrusion disposed in the other one of the top face of the upper flange and the bottom face of the upper support; and wherein the pair of magnets are disposed on the upper flange and the upper support forward of the keyed slot closer to the grip portion than the keyed slot.

8. The access panel of claim 7, wherein each of the magnets comprises a rare earth magnet.

9. The access panel of claim 7, wherein the retention mechanism comprises a first retention mechanism for retaining the top face of the upper flange in contact with the bottom face of the upper support and a second retention mechanism for retaining the top face of the lower flange in contact with the bottom face of the lower flange.

10. The access panel of claim 7, wherein the keyed slot inhibits movement of the handle in a direction normal to a plane of the access panel.

11. The access panel of claim 7, wherein the pair of magnets inhibits movement of the handle in a downward direction absent application of a predetermined force.

12. An aircraft comprising:

an access panel;

at least one handle assembly connected to the access panel, the at least one handle assembly comprising:

a support structure including upper and lower supports attached to the access panel, each of the upper and lower supports comprising a top face and a bottom face;

a handle for selectively engaging with the support structure, the handle comprising:
a grip portion; and
upper and lower flanges extending perpendicularly from the grip portion, each of the upper and lower flanges comprising a top face; and a retention mechanism comprising a pair of magnets and a keyed slot for retaining the handle in contact with the support structure, wherein the pair of magnets are disposed closer to the grip portion than the keyed slot.

13. The aircraft of claim 12, wherein each of the magnets comprises a rare earth magnet and wherein a first magnet of the pair of magnets is disposed in the top face of the upper flange and wherein a second magnet of the pair of magnets is disposed in the bottom face of the upper support.

14. The aircraft of claim 12, wherein the keyed slot comprises a protrusion in one of the top face of the upper flange and the bottom face of the upper support and a corresponding slot for receiving and retaining the protrusion disposed in the other one of the top face of the upper flange and the bottom face of the upper support.

15. The aircraft of claim 12, wherein the retention mechanism comprises a first retention mechanism for retaining the top face of the upper flange in contact with the bottom face of the upper support and a second retention mechanism for retaining the top face of the lower flange in contact with the bottom face of the lower flange.

16. The aircraft of claim 12, wherein the keyed slot inhibits movement of the handle in a direction normal to a plane of the access panel.

* * * * *